United States Patent
Gajji et al.

(10) Patent No.: US 9,771,794 B2
(45) Date of Patent: Sep. 26, 2017

(54) DOWNHOLE DRILLING OPTIMIZATION COLLAR WITH FIBER OPTICS

(71) Applicant: Halliburton Energy Services, Inc., Houston, TX (US)

(72) Inventors: Bhargav Gajji, Pune (IN); Ankit Purohit, Barnagar (IN); Rahul Ramchandra Gaikwad, Pune (IN); Ratish Suhas Kadam, Pune (IN); Abhay Bodake, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 364 days.

(21) Appl. No.: 14/690,203

(22) Filed: Apr. 17, 2015

(65) Prior Publication Data
US 2015/0218933 A1    Aug. 6, 2015

Related U.S. Application Data (63) Continuation of application No. 14/436,469, filed as application No. PCT/US2013/055825 on Aug. 20, 2013, now Pat. No. 9,458,714.

(51) Int. Cl.
*E21B 47/007* (2012.01)
*E21B 47/135* (2012.01)
(Continued)

(52) U.S. Cl.
CPC .......... *E21B 49/003* (2013.01); *E21B 17/006* (2013.01); *E21B 47/0006* (2013.01);
(Continued)

(58) Field of Classification Search
CPC ...... E21B 47/01; E21B 47/02; E21B 47/0006; E21B 47/123; G01V 8/00
See application file for complete search history.

(56) References Cited

U.S. PATENT DOCUMENTS 5,157,331 A * 10/1992 Smith ................ G01V 3/30
                                                324/338
5,193,628 A    3/1993 Hill, III et al.
(Continued)

FOREIGN PATENT DOCUMENTS

| WO | 2012118824 | 9/2012 |
|---|---|---|
| WO | 2015026332 | 2/2015 |

OTHER PUBLICATIONS

Bal, "Optical Fibre Refractive Index, Voltage and Strain Sensors: Fabrication and Applications," Centre for Telecommunication and Microelectronics, 2011: pp. 1-208, <http://vuir.vu.edu.au/18968/1/Harpreet_Kaur_Bal.pdf>.
(Continued)

*Primary Examiner* — Kenneth L Thompson
(74) *Attorney, Agent, or Firm* — Chamberlain Hrdlicka (57) ABSTRACT

A drilling optimization collar for use proximate a drilling tool within a wellbore includes a fiber optic sensor filament that is sized and configured to fit within a groove formed within the drilling optimization collar. The drilling optimization collar may be a pipe segment that is sized and configured to be installed in a drill string proximate the drilling tool, and may have a plurality of sensor elements. All or a portion of the sensor elements may be formed by discrete segments of the sensor filament, and as such, the sensor filament includes sensor elements that are configured to sense a condition of the wellbore and a load on the drilling optimization collar.

20 Claims, 3 Drawing Sheets

(51) Int. Cl.

| | | |
|---|---|---|
| *E21B 49/00* | (2006.01) | |
| *E21B 47/00* | (2012.01) | |
| *E21B 47/01* | (2012.01) | |
| *E21B 47/12* | (2012.01) | |
| *E21B 17/00* | (2006.01) | |
| *G01V 8/16* | (2006.01) | |
| *G01L 1/24* | (2006.01) | |
| *G01M 11/08* | (2006.01) | |
| *E21B 47/06* | (2012.01) | |

(52) U.S. Cl.
CPC .............. *E21B 47/01* (2013.01); *E21B 47/06* (2013.01); *E21B 47/065* (2013.01); *E21B 47/123* (2013.01); *G01L 1/243* (2013.01); *G01L 1/246* (2013.01); *G01M 11/083* (2013.01); *G01V 8/16* (2013.01)

(56) References Cited

U.S. PATENT DOCUMENTS

| | | | |
|---|---|---|---|
| 5,358,059 A | 10/1994 | Ho | |
| 5,517,024 A | 5/1996 | Mullins et al. | |
| 5,898,517 A | 4/1999 | Weis | |
| 6,176,323 B1 | 1/2001 | Weirich et al. | |
| 6,666,285 B2 | 12/2003 | Jones et al. | |
| 6,705,406 B2 | 3/2004 | Das et al. | |
| 6,710,600 B1 | 3/2004 | Kopecki et al. | |
| 6,868,737 B2 | 3/2005 | Croteau et al. | |
| 6,942,043 B2 | 9/2005 | Kurkoski | |
| 6,959,604 B2 | 11/2005 | Bryant et al. | |
| 7,103,982 B2 | 9/2006 | Haugland | |
| 7,303,022 B2 * | 12/2007 | Tilton | E21B 4/02 166/242.1 |
| 7,398,697 B2 | 7/2008 | Allen et al. | |
| 7,597,142 B2 * | 10/2009 | Hartog | E21B 17/025 166/250.01 |
| 7,757,552 B2 | 7/2010 | Bogath et al. | |
| 7,954,560 B2 | 6/2011 | Mathiszik et al. | |
| 8,087,477 B2 | 1/2012 | Sullivan et al. | |
| 8,307,703 B2 | 11/2012 | Moake | |
| 9,019,508 B2 * | 4/2015 | Blacklaw | E21B 47/024 356/462 |
| 9,458,714 B2 * | 10/2016 | Gajji | E21B 47/0006 |
| 2006/0289074 A1 * | 12/2006 | Eriksson | B21C 37/0818 138/171 |
| 2009/0038848 A1 | 2/2009 | Garcia-Osuna | |
| 2010/0219334 A1 | 9/2010 | Legrand et al. | |
| 2012/0096935 A1 | 4/2012 | Finke et al. | |
| 2012/0314988 A1 | 12/2012 | Childers et al. | |
| 2013/0093599 A1 * | 4/2013 | Duncan | G01N 21/954 340/854.7 |
| 2013/0186195 A1 | 7/2013 | Schlosser | |
| 2015/0260037 A1 | 9/2015 | Gajji et al. | |
| 2016/0024912 A1 | 1/2016 | Gajji et al. | |

OTHER PUBLICATIONS

International Search Report and Written Opinion of PCT Application No. PCT/US2013/055825 dated Apr. 30, 2014: pp. 1-12.

Askins et al., "Bend and Twist Sensing in a Multi-Core Optical Fiber," Optical Fiber Communications/National Fiber Optic Engineers Conference, 2008: pp. 109-110.

Muller et al., "Realization of a Fiber-Optic Force-Torque Sensor with Six Degrees of Freedom," Optomechatronic Technologies, Nov. 2008, SPIE Proceedings vol. 7266: pp. 72660S-1-72660S-8.

* cited by examiner

DOWNHOLE DRILLING OPTIMIZATION COLLAR WITH FIBER OPTICS

FIELD OF THE INVENTION

The present disclosure relates generally to a downhole, drilling optimization collar having integrated fiber optic sensors to collect information about drilling conditions.

DESCRIPTION OF RELATED ART

Wells are drilled at various depths to access and produce oil, gas, minerals, and other naturally-occurring deposits from subterranean geological formations. The drilling of a well is typically accomplished with a drill bit that is rotated within the well to advance the well by removing topsoil, sand, clay, limestone, calcites, dolomites, or other materials. The drill bit is typically attached to a drill string that may be rotated to drive the drill bit and within which drilling fluid, referred to as "drilling mud" or "mud", may be delivered downhole. The drilling mud is used to cool and lubricate the drill bit and downhole equipment and is also used to transport any rock fragments or other cuttings to the surface of the well.

As wells are established it is often useful to obtain information about the well, the geological formations through which the well passes, and the conditions within the wellbore near the drilling bit, including information about the drill string itself. Information gathering of this type is typically performed using tools that are coupled to or integrated with the drill string. This process of "measurement while drilling (MWD)" uses measurement tools to determine formation and wellbore temperatures and pressures, as well as the trajectory of the drill bit. The process of "logging while drilling (LWD)" uses tools to determine additional formation properties such as permeability, porosity, resistivity, and other properties.

In some instances, a tool, such as a collar tool, may be installed in a drill string adjacent, or near the drilling bit to obtain measurements relating to near-bit operating conditions. The collar tool may gather measurements that are provided to a drilling operator relating to, for example, the transfer of energy from surface to the bit. This type of information, obtained from MWD and LWD measurements, allows operators to better understand and control ongoing drilling operations.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In addition to measuring and logging formation qualities within a wellbore, it may also be desirable to gather information about the conditions of a tool in a drill string. For example, a drilling optimization collar may be included in a drill string to gather real-time measurements of weight, torque and bending moment experienced at or very near the drill bit. Such measurements can help optimize drilling parameters to maximize performance and minimize wasted energy transfer and vibration during drilling. A drilling optimization collar may include multiple sensors to provide weight, torque and bending moment values and may also include a vibration sensor that takes and delivers a full suite of vibration measurements relating to vibration experienced in the drill string or localized vibration measurements experienced at specific sensor locations.

The illustrative embodiments described in the following disclosure relate to measurement of wellbore and drill string properties proximate a drill bit or elsewhere in a drill string. The illustrative embodiments include measurement and sampling tools that may be used with any of the various techniques employed for evaluating and optimizing drilling processes, including, for example, measurement-while-drilling (MWD) and logging-while-drilling (LWD).

Figure 1:
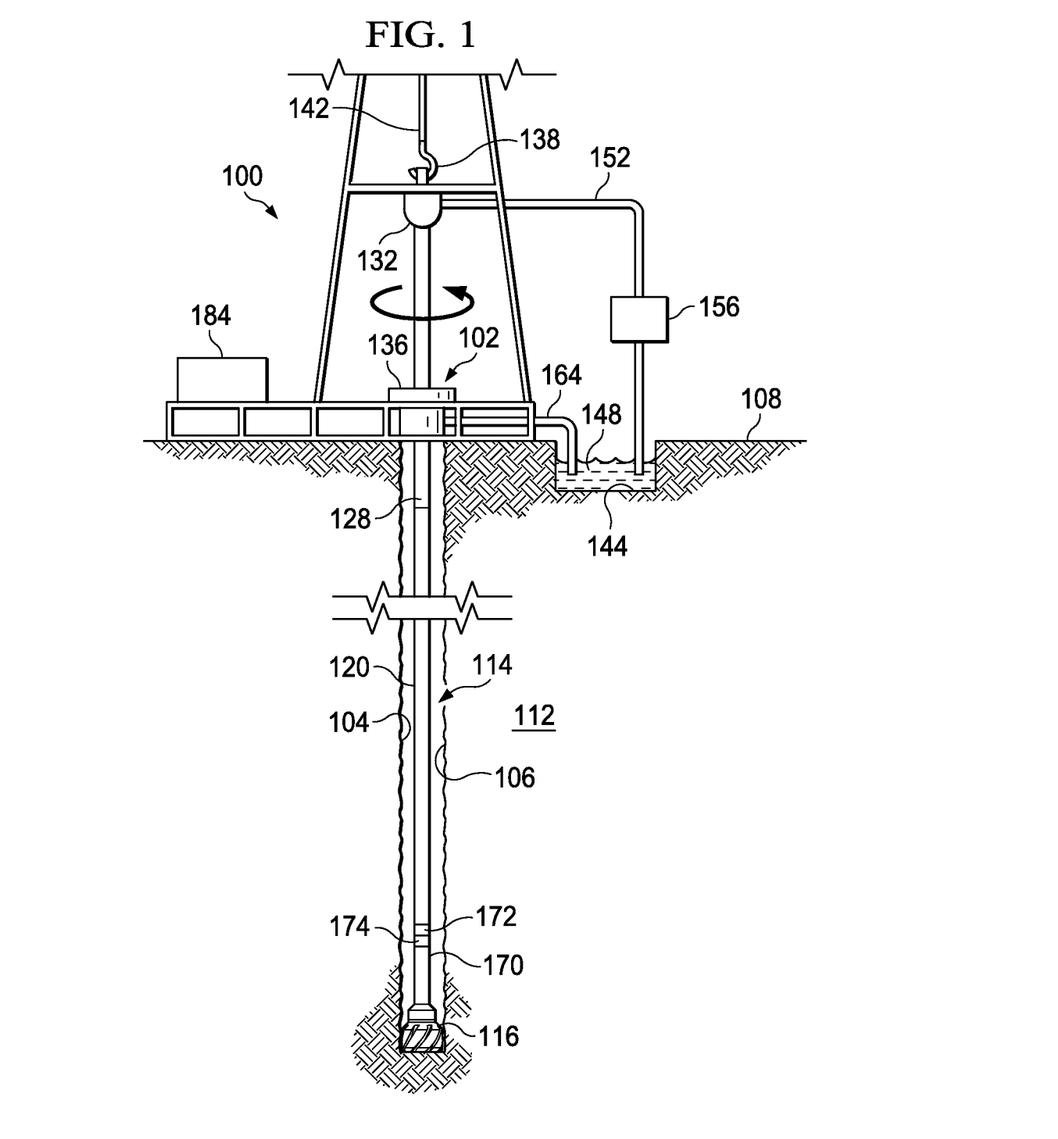
FIG. 1 illustrates a schematic view of a well in which a system for measuring and monitoring near-bit conditions according to an illustrative embodiment of invention is deployed in an MWD assembly.

Referring to FIG. 1, a drilling optimization system 100 having a drill string 120 that includes a drilling optimization subassembly 170 according to an illustrative embodiment of the invention is used in a well 102. The well 102 has a wellbore 104 that extends from a surface 108 of the well 102 to or through a subterranean formation 112. The well 102 is illustrated onshore in FIG. 1 with the drilling optimization system 100 being deployed in the well 102. FIG. 1 illustrates a possible use of the drilling optimization system 100 during a drilling operation. While the following description of the drilling optimization system 100 focuses primarily on the use of the drilling optimization system 100 in a subterranean formation 112, the drilling optimization system 100 may be used instead in subsea well configurations accessed by a fixed or floating platform, and well 102 configurations having different geometries.

In FIG. 1A, the well 102 is formed by a drilling process, in which a drill bit 116 is turned by the drill string 120 that extends from the drill bit 116 to the surface 108 of the well 102. The drill string 120 may be made up of one or more connected tubes or pipes, of varying or similar cross-section. The drill string 120 may refer to the collection of pipes or tubes as a single component, or alternatively to the individual pipes or tubes that comprise the string. The term drill string 120 is not meant to be limiting in nature and may refer to any component or components that are capable of transferring rotational energy from the surface 108 of the well 102 to the drill bit 116. In several embodiments, the drill string 120 may include a central passage disposed longitudinally in the drill string 120 and capable of allowing fluid communication between the surface 108 of the well 102 and downhole locations.

At or near the surface 108 of the well 102, the drill string 120 may include or be coupled to a kelly 128. The kelly 128 may have a square, hexagonal or octagonal cross-section. The kelly 128 is connected at one end to the drill string 120 and at an opposite end to a rotary swivel 132. The kelly 128 passes through a rotary table 136 that is capable of rotating the kelly 128 and thus the remainder of the drill string 120 and drill bit 116. The rotary swivel 132 allows the kelly 128 to rotate without rotational motion being imparted to the rotary swivel 132. A hook 138, cable 142, traveling block (not shown), and hoist (not shown) are provided to lift or lower the drill bit 116, drill string 120, kelly 128 and rotary swivel 132. The kelly 128 and swivel 132 may be raised or lowered as needed to add additional sections of tubing to the drill string 120 as the drill bit 116 advances, or to remove sections of tubing from the drill string 120 if removal of the drill string 120 and drill bit 116 from the well 102 are desired.

As referenced herein, "coupled" generally means that two (or more) items are joined, connected, fastened, linked, or otherwise associated with one another. The present disclosure contemplates a number of types of couplings better items, including mechanical couplings, fluid couplings, optical couplings, electrical couplings, and communicative couplings. Two items may be understood to be mechanically coupled when connected by a mechanical coupling, such as a weld, adhesive, or any other type of physical coupling including mechanical fasteners such as bolts and fittings. The phrases "fluidly coupled," "fluidly connected," and "in fluid communication" refer to a form of coupling, connection, or communication related to fluids, and the corresponding flows or pressures associated with these fluids. Reference to a fluid coupling, connection, or communication between two components describes components that are associated in such a way that a fluid can flow between or among the components. Similarly, two components are said to be optically coupled if an optical connection between the two components is established to transmit an optical signal; electrically coupled if a conductive connection is established between the two components to transmit an electrical signal or a potential; and communicatively coupled if a communications channel is established between the two components to facilitate the exchange of communications via, for example, a wired or wireless communications protocol.

A reservoir 144 is positioned at the surface 108 and holds drilling mud 148 for delivery to the well 102 during drilling operations. A supply line 152 is fluidly coupled between the reservoir 144 and the inner passage of the drill string 120. A pump 156 drives fluid through the supply line 152 and downhole to lubricate the drill bit 116 during drilling and to carry cuttings from the drilling process back to the surface 108. After traveling downhole, the drilling mud 148 returns to the surface 108 by way of an annulus formed between the drill string 120 and the wellbore 104. At the surface 108, the drilling mud 148 is returned to the reservoir 144 through a return line 164. The drilling mud 148 may be filtered or otherwise processed prior to recirculation through the well 102.

As shown in FIG. 1, a drilling optimization subassembly 114 may be positioned adjacent the drill bit 116 to measure, process, and communicate data regarding the wellbore 104 conditions proximate the drill bit 116 to measure or estimate the forces and deflection experienced by the drill bit 116. As referenced herein, the wellbore 104 conditions proximate the drill bit 116 and forces and deflection experienced by the drill bit 116 may be collectively referred to as the "near-bit conditions." The near-bit conditions may also include the axial deflection of the collar, radial deflection, bending, and torsional deflection. Knowledge of the near-bit conditions may enable a drill operator to prevent failure of elements associate with the drill bit 116 and drill string 120. Abrupt changes to the near-bit conditions may indicate a number of issues that an operator would desire to resolve before continuing drilling. For example, an abrupt increase in certain near-bit conditions, such as deflection at the drill bit 116, may indicate a high risk of failure of the drill bit 116 or drill string 120.

Measurement of the near-bit conditions may also indicate other data that is commonly tracked during drilling, such as weight-on-bit and torque-on-bit. Here, weight-on-bit is a measurement of the axial force applied along the drill string 120 from the drill bit 116 to the bottom of the wellbore 106. Torque-on-bit is a measurement of torque, experienced adjacent the drill bit 116, and indicates the tangential force applied at the circumference of the drill bit 116, adjacent the wellbore 106. A drilling operator may also desire to know the conditions within the wellbore 106 adjacent the drill bit 116, such as pressure and temperature. Such measurements may also be gathered using the drilling optimization subassembly 114. It is noted that in the embodiment of FIG. 1, the drilling optimization subassembly 114 is shown as a drilling optimization collar installed proximate the drill bit 116 to monitor near-bit conditions. In another embodiment, however, the drilling optimization subassembly 114 may be installed at other locations in the drill string 120 to provide data relating to such other locations within the drill string 120.

In some embodiments, the drilling optimization subassembly 114 may include a plurality of components that are coupled to one another by threads, couplings, welds, or other means. In the illustrative embodiment depicted in FIG. 1, the drilling optimization subassembly 114 includes a transceiver unit 172, a power unit 174, and a sensor unit 170. As described herein, the elements of the drilling optimization subassembly 114 may be integrated into a drilling optimization collar that is installed in the drill string 120 adjacent the drill bit 116. Each component of the drilling optimization subassembly 114 may include control electronics such as processor devices, memory devices, data storage devices, and communications devices, or the drilling optimization subassembly 114 may include a centralized control that communicates with and controls one or more of the individual components.

The transceiver unit 172 is capable of communicating with a surface controller 184 or similar equipment at or near the surface 108 of the well 102. Communication between the transceiver unit 172 and the surface controller 184 may be by wire if the drill string 120 is wired. Alternatively, the transceiver unit 172 and surface controller 184 may communicate wirelessly using mud pulse telemetry, electromagnetic telemetry, or any other suitable communication method. Data transmitted by the transceiver unit 172 may include without limitation sensor data or other information measured by the drilling optimization subassembly 114, including data indicating near-bit conditions. The surface controller 184 may include processing devices, memory devices, data storage devices, communication devices, and user input/output devices. The surface controller 184 may communicate data to the transceiver unit 172 such as control data to direct various components of the drilling optimization subassembly 114.

The power unit 174 may be hydraulically powered by fluid circulated through the well 102 or by fluid circulated or pressurized in a downhole, closed-loop hydraulic circuit. Alternatively, the power unit 174 may be an electrical power unit, an electro-mechanical power unit, a pneumatic power unit, or any other type of power unit that is capable of harnessing energy for transfer to powered devices. The power unit 174 may provide power to one or more of the components associated with the drilling optimization subassembly 114, or alternatively to one or more other downhole devices. The sensor unit 170 may also receive power from the power unit 174 and may contain the types of sensors described below with reference to FIG. 2.

Figure 2:
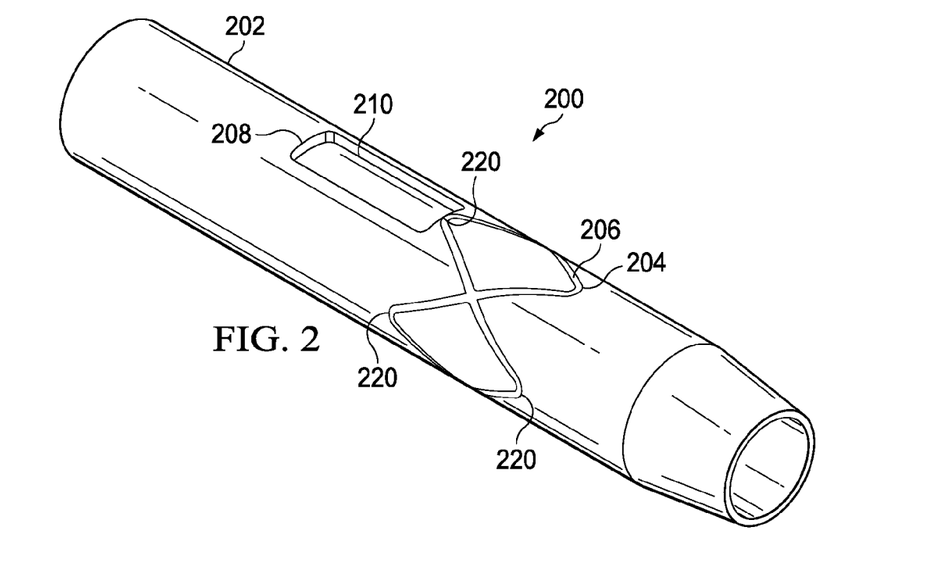
FIG. 2 depicts a front, isometric view of a drilling optimization collar having a groove extending around an external surface of the drilling optimization collar and housing a fiber optic sensor filament.

Referring now to FIG. 2, an embodiment of the drilling optimization subassembly is shown as a drilling optimization collar 200, which is a segment of the drill string. The drilling optimization collar 200 may be formed from a pipe segment 202 or elements of a pipe segment 202, such as half-cylinders that may be hinged or fastened together to position the pipe segment 202 around the external surface of the drill string as a retrofit after other elements of the string have already been installed. The pipe segment 202, or elements that form the pipe segment 202, may be formed from a titanium alloy, a stainless steel alloy, or any other suitable material. The pipe segment 202 may be installed on a segment of the drill string adjacent a drill bit, as described above with regard to FIG. 1. As shown in the figures, an electronics-housing compartment 208 houses electronics, including a control unit 210, and one or more grooves 204 are formed circumferentially about the pipe segment 202 in, as shown by way of example, an oscillatory or wave-like path. The grooves 204 may be machined into an external wall of the pipe segment 202 using a lathe or any other suitable type of machinery.

It is noted that while an oscillatory path is shown, the groove 204 could be formed to have any other suitable path. For example, the groove 204 could have a straight-line or linear path, a square-wave path, a helical path, or a customized path to house sensor elements 220 at other key locations near a drill bit. The one or more grooves 204 house one or more fiber optic sensor filaments 206 that can be used to detect the near-bit conditions. The sensor filaments 206 are optically and communicatively coupled to the control unit 210 where the one or more grooves 204 intersect or are otherwise connected to the electronics-housing compartment 208.

As drilling of oil wells is extended to greater depths and harsh environments, observance of the near-bit conditions may become even more useful for drilling optimization. Existing tools are limited by the operating temperature, torsion range at which they work, cost of manufacturing, and reliability. Thus, according to an illustrative embodiment, the sensor filaments 206 are configured to have sensing capabilities, including the ability to sense strain, temperature, and pressure over a wide range of temperatures and torsion ranges, and may be economically manufactured for a number of reasons. For example, as compared to other types of sensors, such as resistive or capacitive strain gauges formed from complex metallic circuit elements, sensors formed from segments of the sensor filament 206 may take up less space and use less electrical connections while still offering a high number of strain sensing locations because distinct segments of the sensor filament 206 may form separate fiber optic sensors, or sensor elements 220.

The sensor filament 206 may be optically and communicatively coupled to the control unit 210 to receive and convey a fiber optic signal. The control unit 210 includes a light sensor and is thereby operable to measure changes in the refractive index of the sensor filament 206 between the point where the sensor filament 206 joins the control unit 210 and reflective elements in the sensor filament 206. Each segment of the sensor filament 206 between reflective elements may form a sensor element 220. Such sensor elements 220, which may be, for example, Bragg gratings, are shown schematically in FIG. 2. As referred to herein, a Bragg grating is a segment of fiber optic filament, such as the sensor filament 206, having a distributed reflector that reflects particular wavelengths of light while transmitting all others. By constructing a sensor filament 206 having multiple Bragg gratings, each corresponding to a different wavelength of light, the sensor filament 206 may simultaneously transmit measurement signals that are wavelength multiplexed. The sensor elements 220, each of which may correspond to a Bragg grating, may be configured to be sensitive to strain and temperature resulting in the sensor element 220 undergoing a change in its refractive index in response to changes in strain and temperature.

As noted, each sensor element 220 may reflect only a particular wavelength, or span of wavelengths of light, and by alternating the reflective wavelength of each reflective element, a single sensor filament 206 may be formed to include multiple fiber optic sensors, wherein each span of sensor filament 206 between a reflective element, or Bragg grating, and the control unit 210 may function as an individual sensor.

For example, a relative shift in wavelength of a sensor element 220 having a Bragg grating may indicate a change in the temperature and strain to which the sensor element 220 is subjected. As such, sensor elements 220 may be used to measure changes in temperature and pressure may be positioned about the pipe segment 202 to undergo minimal deformation while sensor elements 220 used to measure changes in deformation, or strain, may be positioned at a location where the difference in temperature relative to a baseline temperature is known.

Similarly, pressure and physical deformation of different points on the drilling optimization collar 200 may be determined by affixing sensor elements 220 at different points on the drilling optimization collar 200. As a point on the drilling optimization collar 200 is deformed, strain will be induced on the sensor element 220 that is located at that point and detection of the strain can be used to determine the overall deflection experienced by the drilling optimization collar 200. Such determinations can provide an estimation or approximate measurement of similar forces being experienced at the drill bit. It is further noted that, sensor elements 220 placed above the periphery of a drilling optimization collar may also be used to determine changes in pressure in the wellbore or in the drilling string. Because changes in pressure will result in a change in the compressive load being imparted on the drilling string, the amount of deformation that is uniformly, or approximately uniformly experienced about the circumference of the drilling optimization collar 200 may be used to determine the pressure in the wellbore by balancing a known pressure within the drilling string and the corresponding forces being imparted from the drilling string against the internal surface of the drilling optimization collar 200.

Interpretation of the optical signals, which may include monitoring changes in the refractive index of the sensor filament 206 between each sensor element 220, enables the determination of measurements relating to the deflection of the drill bit and strain of the drilling optimization collar 200, which may also indicate weight-on-bit and torque-on-bit.

The ability to use a single sensor filament 206 as multiple sensors is advantageous as compared to other types of sensor elements 220, such as resistive strain gauges, which would be relatively fragile and require an excessive number of electrical connections. Another advantage of the sensor elements 220 as compared to resistive, capacitive, or other wired sensors is that the fiber optic materials may be more resistant to high temperatures and pressures, thereby allowing the sensor filaments 206 to be routed along or very close to the outer surface of the drilling optimization collar 200. Exposing the sensor filaments 206 to the wellbore enables additional measurements to be accurately taken, such as pressure and temperature near the drill bit.

According to an illustrative embodiment, multiple sensor elements 220 within a single sensor filament 206 are used to measure near-bit conditions, such as torque-on-bit, weight-on-bit, and other conditions. The drilling optimization collar 200 may be formed with a high degree of precision, such that the groove 204 houses and orients the sensor filament 206 along a path than enables measurement of torque-on-bit and weight-on-bit simultaneously. To detect other near-bit conditions, a specially processed fiber having sensitivity to certain environmental changes such as temperature and pressure may be used. It is further noted that the sensor elements 220 may be spaced about the drilling optimization collar 200 to provide multiple points of measurement, thereby providing redundant measurements and increasing the reliability of the measured data.

According to an illustrative embodiment, the control unit 210 supplies an optical signal to the fiber optic sensor filament 206, which extends through the groove 204 about the periphery of the pipe segment 202. In an embodiment, the control unit 210 is communicatively coupled to a surface controller or another surface location to transmit measured data to a drilling operator. Sensor elements 220 within the sensor filament 206 may generate signals relating to the near-bit conditions. The signals may be multiplexed along the sensor filament 206 using a multiplexing technique, such as wavelength division multiplexing or time division multiplexing. As shown in FIG. 2, the sensor elements 220 are formed within a single sensor filament 206 such that each sensor element 220 is connected in series. In other embodiments, multiple sensor filaments 206 may be applied to the pipe segment 202 in parallel, and each sensor filament 206 may include only a single sensor element 220.

In an embodiment, measurements taken by the control unit 210 are transmitted to the surface controller to optimize the drilling process. As described herein, the control unit 210 and sensor filament 206 may operate as a plurality of sensor elements 220, or a plurality of sensors, that determine near-bit conditions relating to the deformation and forces being experienced by the drill bit and wellbore conditions proximate the drill bit. The control unit 210 can transmit the measurements to the surface controller using wired communications, mud pulse telemetry, electromagnetic telemetry, or another suitable communication method. The surface controller may analyze measurements received from the control unit 210 to inform decisions about the operation of the drill string. For example, the measurements may be used to optimize the operation of the drill string within the wellbore. Such methods of optimization may include altering the speed of operation of the drill bit, changing the direction or path of the drill string, supplying drilling mud to the drill bit at a faster rate to cool the drill bit, supplying the drilling mud to the drill bit at a slower rate to conserve drilling mud, or temporarily ceasing drilling operations.

Figure 3:
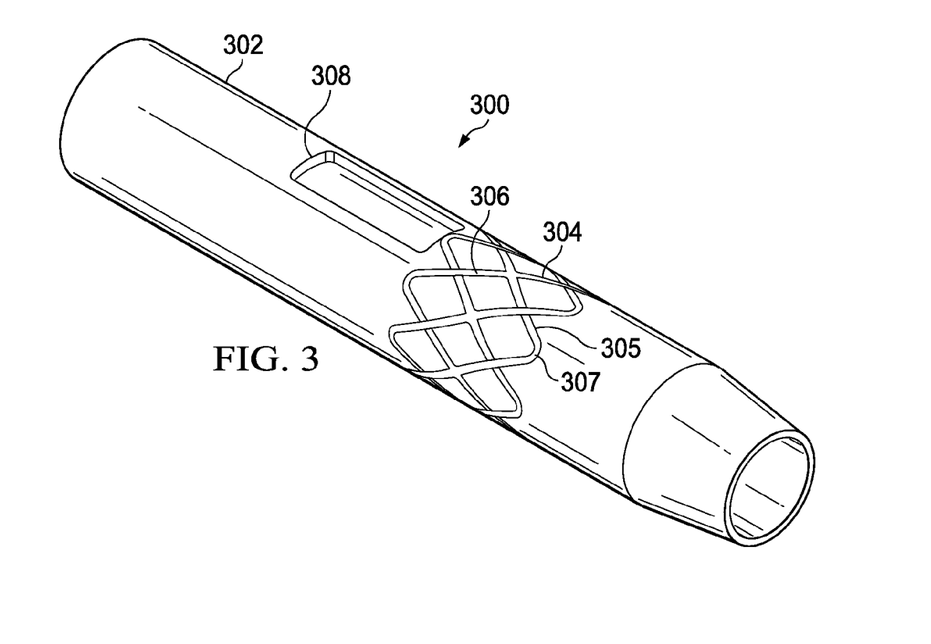
FIG. 3 depicts a front, isometric view of a drilling optimization collar having a second groove extending around an internal surface of the drilling optimization collar and housing a second fiber optic sensor filament.
Figure 4:
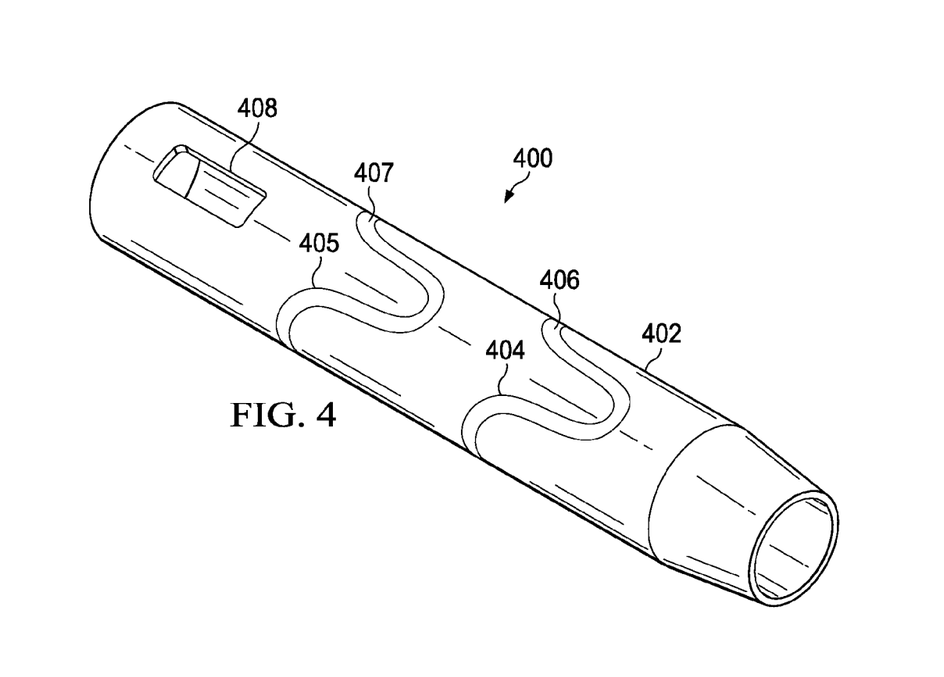
FIG. 4 depicts a front, isometric view of a drilling optimization collar having a second groove extending around the external surface of the drilling optimization collar that is axially offset from the first groove.
Figure 5:
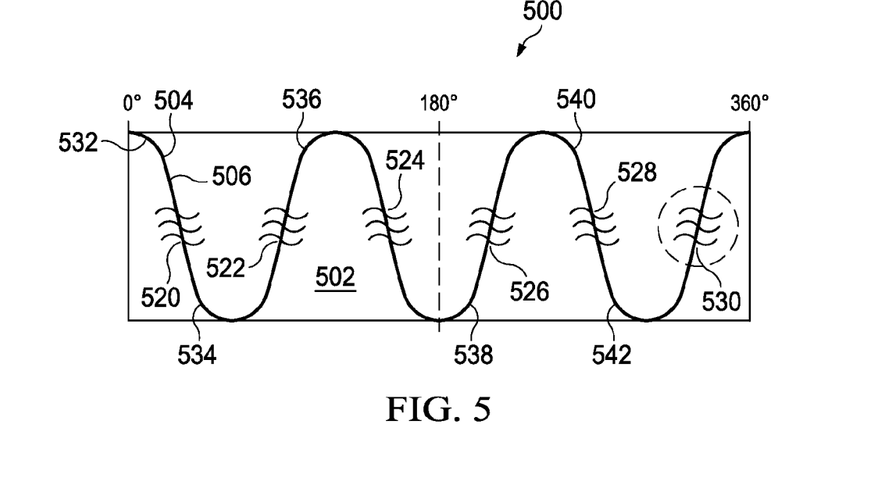
FIG. 5 depicts a schematic view of a circumference of a drilling optimization collar, including locations of distinct sensor elements.

FIGS. 3-5 show additional embodiments of drilling optimization collars that are similar to those described with regard to FIG. 2. In an embodiment, a drilling optimization collar may be desirable to include a first sensor filament 306 and a second sensor filament 307, as shown in FIG. 3. In such an embodiment, a first groove 304 may house the first sensor filament 306 at the outer surface of the pipe segment 302 and the second sensor filament 307 may be embedded within a channel, such as second groove 305, which is formed about the circumference of the pipe segment 302 of the drilling optimization collar 300 along the internal surface of pipe segment 302. In such an embodiment, the second sensor filament 307 residing in the second groove 305 may be better situated to measure deformation of the drilling optimization collar 300 because it may be insulated from the varying external conditions of the wellbore, while the first sensor filament 306 may therefore be better situated to take measurements relating to the wellbore conditions near the drill bit.

FIG. 4 shows an embodiment of a drilling optimization collar 400 having a first groove 404 and a second groove 405 formed within an external wall of the pipe segment 402. The first groove 404 and second grove 405 are axially offset from one another along the axis of the pipe segment 402. In such an embodiment, the first sensor filament 406 and second sensor filament 407 are similarly offset from one another. As a result, measurements taken using the first sensor filament 406 and second sensor filament 407 may provide a second reference point, which may supply a level of redundancy with regard to measurements that are indicative of the deformation being experienced by the drilling optimization collar 400. It is noted that while the first groove 404, second groove 405, first sensor filament 406, and second sensor filament 407 are shown as following oscillatory paths about the circumference of the drill string, other suitable paths may also be implemented in place of an oscillatory path, including, for example, a straight line path, circular path, or a path that concentrates sensor filaments in portions of the drilling optimization collar 400 that an operator desires to measure. In each case, the path may be configure to enable the first sensor filament 406 and second sensor filament to provide measurements of stretching, torsional, and other deformation of the drilling optimization collar 400 and well pipe.

FIG. 5 shows a schematic representation of a drilling optimization collar 400 having a plurality of sensor elements included within a sensor filament 506, which is installed within a groove 504 about the circumference of the drilling optimization collar 500. Here, a first sensor element 532 includes a first portion of the sensor filament 506 and a first Bragg reflector 520; a second sensor element 534 includes a second portion of the sensor filament 506 and a second Bragg reflector 522; a third sensor element 536 includes a third portion of the sensor filament 506 and a third Bragg reflector 524; a fourth sensor element 538 includes a forth portion of the sensor filament 506 and a fourth Bragg reflector 526; a fifth sensor element 540 includes a fifth portion of the sensor filament 506 and a fifth Bragg reflector 528; and a sixth sensor element 542 includes a sixth portion of the sensor filament 506 and a sixth Bragg reflector 530.

In an embodiment, 24 sensor elements may be included within the sensor filament 506. It is noted that while the start and end point of each sensor element, as defined by the Bragg reflectors 520-530 are shown as being spaced at regular intervals, the locations of the Bragg reflectors are merely illustrative and the Bragg reflectors may instead be spaced at irregular intervals or at locations that optimize the ability of the drilling optimization collar 500 to provide accurate measurements relating the deformation of the drilling optimization collar 500 and wellbore conditions. For example, the first sensor element 532 and first Bragg reflector 520 may be located on the opposite side of the drilling optimization collar 500 from the fourth sensor element 538 and fourth Bragg reflector 526 to provide redundant measurements relating to the bending or torsional deformation being experienced by the drill bit. Similarly, the second sensor element 534 and second Bragg reflector 522 may be positioned as close to the drill bit as possible to provide an accurate measurement of near-bit wellbore conditions. Each sensor element may be situated to provide a separate measurement relating to the near-bit conditions as well. For example, sensor elements may be provided and optimized to measure axial deflection, a bending moment, radial deflection, torsional deflection, pressure, and/or temperature.

In an embodiment, the material and manufacturing process used to form the sensor filament and Bragg gratings may depend on the sophistication of the sensing fiber optic, and may be selected to provide a sensor filament that provides measurements in any fiber optic based system in which a single fiber optic filament is used to provide measurements from multiple locations.

In view of the foregoing detailed description, it is noted that, according to an illustrative embodiment, a drilling optimization collar for use proximate a drilling tool within a wellbore includes a pipe segment that is sized and configured to be installed in a drill string proximate the drilling tool. A groove is formed within the outer surface of the pipe segment, and may form an oscillatory path about the circumference of the pipe segment. The collar also includes a sensor filament that is sized and configured to fit within the groove resides therein. The sensor filament includes a plurality of sensor elements, each of which includes a segment of the fiber optic filament. The sensor filament is configured to sense both a condition of the wellbore and a load on the drilling optimization collar. The sensor elements may be arranged in series or in parallel, and may be separated by a reflector, or reflective element. Further, each sensor element may be a Bragg grating that includes both sensing and reflective capabilities. In one embodiment, the sensor elements include an axial deflection sensor, a bending moment sensor, a radial deflection sensor, a torsional deflection sensor, a pressure sensor, and a temperature sensor. Adjacent the groove, the pipe segment may also include an electronics chassis compartment, and a sensor control unit may reside within the electronics chassis compartment and be communicatively coupled to the sensor filament.

According to another illustrative embodiment, a system for collecting information from a wellbore includes a surface controller operable to control the operating parameters of a drill string. The drill string has a drilling tool and a drilling optimization collar proximate the drilling tool. The drilling optimization collar also includes a sensor, which includes a sensor filament, and a control unit. The control unit is communicatively coupled to the sensor element and the surface controller, and includes a transceiver and a light source that is optically coupled to the sensor filament. The drilling optimization collar also includes a power source that is electrically coupled to the control unit and the light source element. The sensor filament is disposed about the drilling optimization collar, and a refractive index of the sensor filament is configured to change when one or more of a wellbore condition changes. The control unit is operable to measure the refractive index of the sensor filament and to detect changes in the refractive index of the sensor filament. In the embodiment, the sensor filament is disposed within a groove that spans the circumference of the drilling optimization collar, and the sensor filament includes a plurality of sensor elements arranged about the circumference of the drilling optimization collar to sense a plurality of sensed parameters. Each of the plurality of sensor elements may be arranged in series and separated from an adjacent sensor element by an intermediate reflector, such as a Bragg grating. A first sensor element may be configured to provide a measurement indicative of the wellbore and a second sensor element may be configured to provide a measurement indicative of the deflection of the drilling optimization collar. It is noted that in one embodiment, a first portion of the groove may be formed within an interior surface of the drilling optimization collar and a second portion of the groove may be formed within an exterior surface of the drilling optimization collar. In such an embodiment, a first sensor element may be disposed within the first portion of the groove, a second sensor element may be disposed within the second portion of the groove, and a Bragg grating may be disposed between the first sensor element and the second sensor element.

According to another illustrative embodiment, a method for monitoring environmental conditions proximate a drilling tool includes installing a drilling optimization collar on a drill string proximate the drilling tool. The drilling optimization collar has a sensor element and a control unit, and the drilling optimization collar sensor element includes a sensor filament and a reflector. The control unit is communicatively coupled to the sensor element and includes a transceiver and a light source. The drilling optimization collar also includes a light measuring device, and the light source and light measuring device are optically coupled to the sensor filament. The control unit is operable to measure the refractive index of the sensor filament and to detect changes in the refractive index of the sensor filament. The method also includes coupling a power source to the control unit, actuating the light source using the control unit, and determining a refractive index of the sensor filament. In addition, the method includes determining a wellbore condition based on the refractive index of the sensor filament and communicating a value indicative of the determined wellbore condition to a surface controller. In accordance with the method, the sensor filament may be disposed within a groove of the drilling optimization collar and may include a plurality of sensor elements arranged about the circumference of the drilling optimization collar and separated by Bragg gratings. The method may also include determining the refractive index of each of the plurality of sensor elements, determining the deformation of the drilling optimization collar based on the refractive index of at least one of the plurality of sensor elements, and determining one or more wellbore conditions based on the refractive index of at least one of the plurality of sensor elements. In an embodiment, a first of the plurality of sensor elements may be configured to provide a measurement indicative of the wellbore condition and wherein a second of the plurality of sensor elements may be configured to provide a measurement indicative of the deflection of the drilling optimization collar. The type of deflection of the drilling optimization collar being measured may be torsional deflection, bending, axial deflection, or radial deflection. Also, the measurement indicative of the wellbore condition may be a temperature measurement or a pressure measurement. The method may also include adjusting a drilling parameter in response to the determined wellbore condition and the deflection of the drilling optimization collar.

Even though only a few specific examples are provided for the systems that may be employed to measure the deflection of a drill string or a drill collar adjacent a drill bit, it is noted that any combination embodiments discussed above of illustrative drilling optimization collars and sensor configurations is suitable for use with the systems and methods described herein.

The drilling optimization collar and related systems and methods may be described using the following examples:

Example 1

A drilling optimization collar for use proximate a drilling tool within a wellbore, the drilling optimization collar comprising:
  a pipe segment sized and configured to be installed in a drill string proximate the drilling tool;
  a groove formed within an external wall of the pipe segment; and
  a fiber optic sensor filament sized and configured to fit within the groove and having a plurality of sensor elements, wherein each of the plurality of sensor elements comprises a segment of the sensor filament;
  wherein the sensor filament is configured to sense a condition of the wellbore and a load on the drilling optimization collar.

Example 2

The drilling optimization collar of example 1, wherein the plurality of sensor elements are arranged in series.

Example 3

The drilling optimization collar of examples 1 and 2, wherein each of the plurality of sensor elements includes a reflector.

Example 4

The drilling optimization collar of examples 1 and 2, wherein each of the plurality of sensor elements includes a Bragg grating.

Example 5

The drilling optimization collar of examples 1-4, wherein the plurality of sensor elements comprises:
  an axial deflection sensor;
  a bending moment sensor;
  a radial deflection sensor;
  a torsional deflection sensor;
  a pressure sensor; and
  a temperature sensor.

Example 6

The drilling optimization collar of examples 1-5, wherein the groove forms an oscillatory path about the circumference of the pipe segment.

Example 7

The drilling optimization collar of examples 1-6, wherein the pipe segment further comprises an electronics chassis compartment, and wherein the drilling optimization collar further comprises a sensor control unit disposed within the electronics chassis compartment and coupled to the sensor filament.

Example 8

A system for collecting information a from a wellbore, the system comprising:
  a surface controller operable to control the operating parameters of the drill string, the drill string having a drilling tool and a drilling optimization collar proximate the drilling tool, the drilling optimization collar having a collar sensor, a control unit, a power source, and a light source, wherein:
  the collar sensor comprises a sensor filament,
  the control unit is communicatively coupled to the sensor filament and the surface controller,
  the light source is communicatively coupled to the light source and optically coupled to the sensor filament,
  the power source is electrically coupled to the control unit and the light source,
  the sensor filament is disposed about the periphery of the drilling optimization collar, and wherein a refractive index of the sensor filament is configured to change when one or more of a wellbore condition changes, and
  the control unit comprises a light sensor to measure the refractive index of the sensor filament and to detect changes in the refractive index of the sensor filament.

Example 9

The system of example 8, wherein the sensor filament is disposed within a groove formed within the outer surface of the drilling optimization collar and wherein the sensor filament comprises a plurality of sensor elements arranged about the circumference of the drilling optimization collar to sense a plurality of sensed parameters.

Example 10

The system of examples 8 and 9, wherein each of the plurality of sensor elements is arranged in series and separated from an adjacent sensor element by an intermediate reflector.

Example 11

The system of examples 8 and 9, wherein each of the plurality of sensor elements is arranged in series and separated from an adjacent sensor element by an intermediate Bragg grating, and wherein a first sensor element is configured to provide a measurement indicative of the wellbore and wherein a second sensor element is configured to provide a measurement indicative of the deflection of the drilling optimization collar.

Example 12

The system of examples 8-11, wherein the control unit is operable to communicate the measurement indicative of the deflection of the drilling optimization collar to the surface controller, and wherein surface controller is operable to adjust the operation of the drill string in response to receiving the measurement.

Example 13

The system of examples 8-12, wherein the drilling optimization collar comprises a first groove formed within the drilling optimization collar, and wherein the sensor filament is disposed within the first groove.

Example 14

The system of example 13, wherein the first groove is formed within an interior surface of the drilling optimization collar, a second groove is formed within an exterior surface of the drilling optimization collar, and a second filament is disposed within the second groove.

Example 15

A method for monitoring environmental conditions proximate a drilling tool using a drilling optimization collar, the drilling optimization collar having a collar sensor and a control unit, wherein the collar sensor comprises a sensor filament and a reflector, the control unit is communicatively coupled to the sensor filament and includes a transceiver, a light source, and a light sensor, the light source and light sensor being optically coupled to the sensor filament, and the control unit being operable to measure the refractive index of the sensor filament and to detect changes in the refractive index of the sensor filament; the method comprising:
- installing the drilling optimization collar on a drill string proximate the drilling tool;
- coupling a power source to the control unit;
- actuating the light source using the control unit, and determining a refractive index of the sensor filament using the light sensor;
- determining a wellbore condition based on a change in the refractive index of the sensor filament; and
- communicating a value indicative of the determined wellbore condition to a surface controller.

Example 16

The method of example 15, wherein the sensor filament is disposed within a groove of the drilling optimization collar and wherein the sensor filament comprises a plurality of sensor elements arranged about the circumference of the drilling optimization collar and separated by a Bragg grating, the method further comprising:
- determining the refractive index of each of the plurality of sensor elements;
- determining the deformation of the drilling optimization collar based on the refractive index of the sensor filament based on the refractive index of at least one of the plurality of sensor elements; and
- determining one or more wellbore conditions based on the refractive index of at least one of the plurality of sensor elements.

Example 17

The method of example 16, wherein, wherein a first of the plurality of sensor elements is configured to provide a measurement indicative of the wellbore condition and wherein a second of the plurality of sensor elements is configured to provide a measurement indicative of the deflection of the drilling optimization collar.

Example 18

The method of example 17, wherein the measurement indicative of the deflection of the drilling optimization collar is selected from the group consisting of a torsional deflection measurement, a bending moment measurement, an axial deflection measurement, and a radial deflection measurement.

Example 19

The method of examples 16 and 17, wherein the measurement indicative of the wellbore condition is selected from the group consisting of a temperature measurement and a pressure measurement.

Example 20

The method of examples 19, further comprising adjusting a drilling parameter in response to the measurement indicative of the wellbore condition and the measurement indicative of the deflection of the drilling optimization collar.

It should be apparent from the foregoing that an invention having significant advantages has been provided. While the invention is shown in only a few of its forms, it is not limited to only these embodiments but is susceptible to various changes and modifications without departing from the spirit thereof.

We claim:

1. A drilling optimization collar for use proximate a drilling tool within a wellbore, the drilling optimization collar comprising:
   - a pipe segment installed in a drill string proximate the drilling tool;
   - a groove formed within an external wall of the pipe segment; and
   - a fiber optic sensor filament within the groove and having a plurality of sensor elements, wherein each of the plurality of sensor elements comprises a segment of the sensor filament, and wherein pairs of sensor elements are placed on opposite sides of the pipe segment;
   - wherein the sensor filament is configured to sense a condition of the wellbore and a load on the drilling optimization collar.

2. The drilling optimization collar of claim 1, wherein the plurality of sensor elements are arranged in series.

3. The drilling optimization collar of claim 1, wherein each of the plurality of sensor elements includes a reflector.

4. The drilling optimization collar of claim 1, wherein each of the plurality of sensor elements includes a Bragg grating.

5. The drilling optimization collar of claim 1, wherein the plurality of sensor elements comprises:
   - an axial deflection sensor;
   - a bending moment sensor;
   - a radial deflection sensor;
   - a torsional deflection sensor;
   - a pressure sensor; and
   - a temperature sensor.

6. The drilling optimization collar of claim 1, wherein the groove forms an oscillatory path about the circumference of the pipe segment.

7. The drilling optimization collar of claim 1, wherein the pipe segment further comprises an electronics chassis compartment, and wherein the drilling optimization collar further comprises a sensor control unit disposed within the electronics chassis compartment and coupled to the sensor filament.

8. The drilling optimization collar of claim 1, wherein the pairs of sensor elements are located approximately 180 degrees from each other around the pipe segment.

9. The drilling optimization collar of claim 1, wherein the plurality of sensors are arranged in series and separated from an adjacent sensor by an intermediate reflector.

10. The drilling optimization collar of claim 1, wherein the condition is torsional deflection.

11. A drilling optimization collar for use proximate a drilling tool within a wellbore, the drilling optimization collar comprising:
    a pipe segment installed in a drill string proximate the drilling tool;
    a groove formed within an external wall of the pipe segment; and
    a fiber optic sensor filament within the groove and having a plurality of sensor elements, wherein each of the plurality of sensor elements comprises a segment of the sensor filament, and wherein the plurality of sensors are arranged in series and separated from an adjacent sensor by an intermediate reflector;
    wherein the sensor filament is configured to sense a condition of the wellbore and a load on the drilling optimization collar.

12. The drilling optimization collar of claim 11, wherein the plurality of sensor elements are arranged in series.

13. The drilling optimization collar of claim 11, wherein each of the plurality of sensor elements includes a reflector.

14. The drilling optimization collar of claim 11, wherein each of the plurality of sensor elements includes a Bragg grating.

15. The drilling optimization collar of claim 11, wherein the plurality of sensor elements comprises:
    an axial deflection sensor;
    a bending moment sensor;
    a radial deflection sensor;
    a torsional deflection sensor;
    a pressure sensor; and
    a temperature sensor.

16. The drilling optimization collar of claim 11, wherein the groove forms an oscillatory path about the circumference of the pipe segment.

17. The drilling optimization collar of claim 11, wherein the pipe segment further comprises an electronics chassis compartment, and wherein the drilling optimization collar further comprises a sensor control unit disposed within the electronics chassis compartment and coupled to the sensor filament.

18. The drilling optimization collar of claim 11, wherein pairs of sensor elements are placed on opposite sides of the pipe segment.

19. The drilling optimization collar of claim 18, wherein the pairs of sensor elements are located approximately 180 degrees from each other around the pipe segment.

20. The drilling optimization collar of claim 11, wherein the condition is torsional deflection.

* * * * *